(12) United States Patent
Hsu

(10) Patent No.: US 8,611,012 B2
(45) Date of Patent: Dec. 17, 2013

(54) LIGHT GUIDE PLATE

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/596,032

(22) Filed: Aug. 27, 2012

(65) Prior Publication Data
US 2013/0279009 A1   Oct. 24, 2013

(30) Foreign Application Priority Data
Apr. 23, 2012   (TW) ............................... 101114310 A

(51) Int. Cl.
*G02B 17/00*   (2006.01)
(52) U.S. Cl.
USPC .......................................... 359/597; 359/598
(58) Field of Classification Search
USPC .................................. 359/597–598, 595, 591
See application file for complete search history.

(56) References Cited

U.S. PATENT DOCUMENTS

| | | | | |
|---|---|---|---|---|
| 586,220 A | * | 7/1897 | Basquin | 359/595 |
| 717,782 A | * | 1/1903 | Wadsworth | 359/594 |
| 720,987 A | * | 2/1903 | Wadsworth | 359/595 |
| 4,411,493 A | * | 10/1983 | Miller | 359/595 |
| 7,902,531 B2 | * | 3/2011 | Ijzerman et al. | 250/504 R |
| 2011/0296795 A1 | * | 12/2011 | Tsai | 359/595 |

* cited by examiner

*Primary Examiner* — Christopher Mahoney
(74) *Attorney, Agent, or Firm* — Altis Law Group, Inc.

(57) ABSTRACT

A light guide plate includes a substrate and horizontally oriented elongated prisms. The substrate is positioned on mounted on an outside surface of a window of a building and includes a first surface and an opposing second surface. The second surface faces the outside surface. The substrate is made of transparent material. The prisms are arranged on the first surface and parallel to each other. Each prism includes a flat side surface facing upward and a curved side surface facing downward. The flat side surface and the curved side surface extend from the first surface and intersect at a line away from the first surface. Each curved side surface is configured for reflecting light passing through the flat side surface to a ceiling of the building.

12 Claims, 3 Drawing Sheets

LIGHT GUIDE PLATE

BACKGROUND

1. Technical Field

The present disclosure relates to a light guide plate.

2. Description of Related Art

Windows serve not only to provide a view to outside but also to allow sunlight to enter a building. However, due to location of a building on earth, the time of year, and even the time of day, the elevation angle of the sun relative to a window may be such that the sunlight does not penetrate into the building very far and so artificial light must be employed even though it may still be daytime.

Therefore, it is desirable to provide a light guide plate, which can overcome or at least alleviate the limitations described.

DETAILED DESCRIPTION

Figure 1:
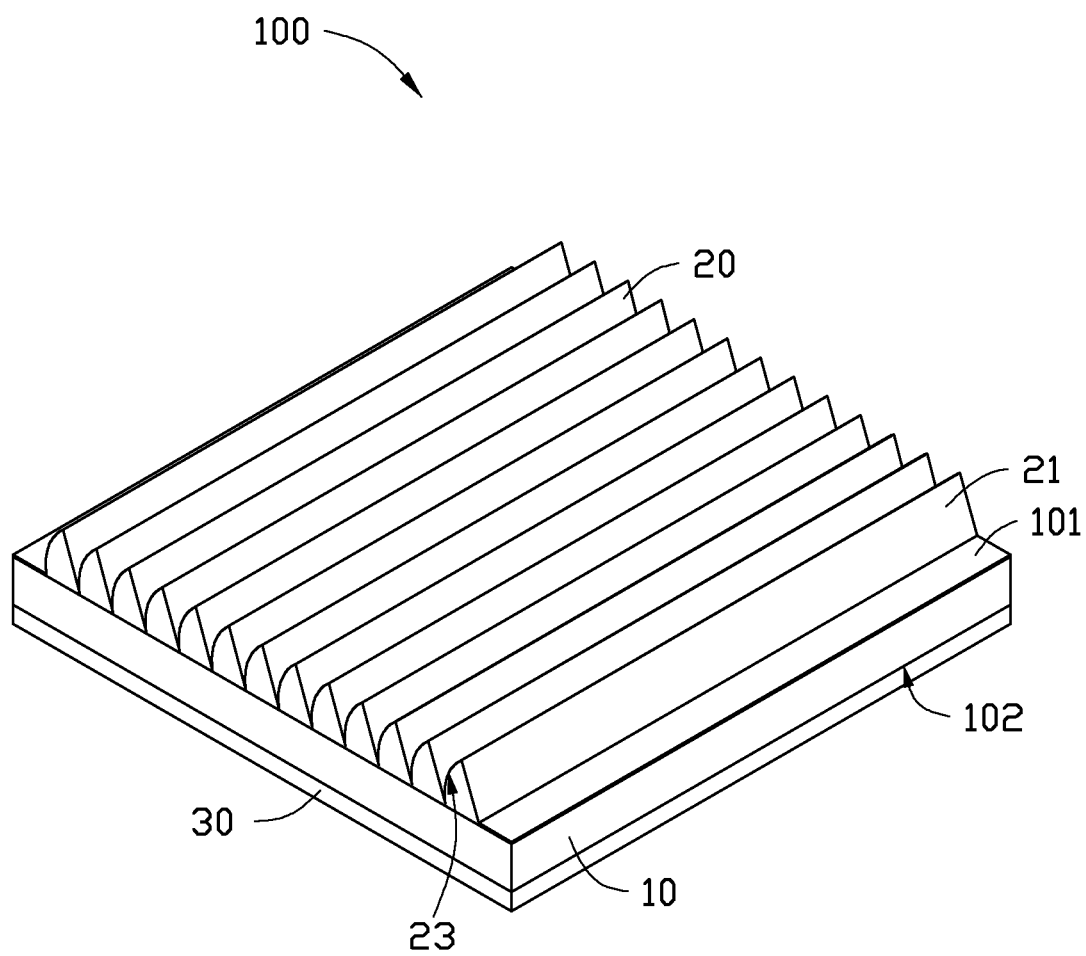
FIG. 1 is a schematic, isometric view of a light guide plate, including an optical film, according to an exemplary embodiment.
Figure 2:
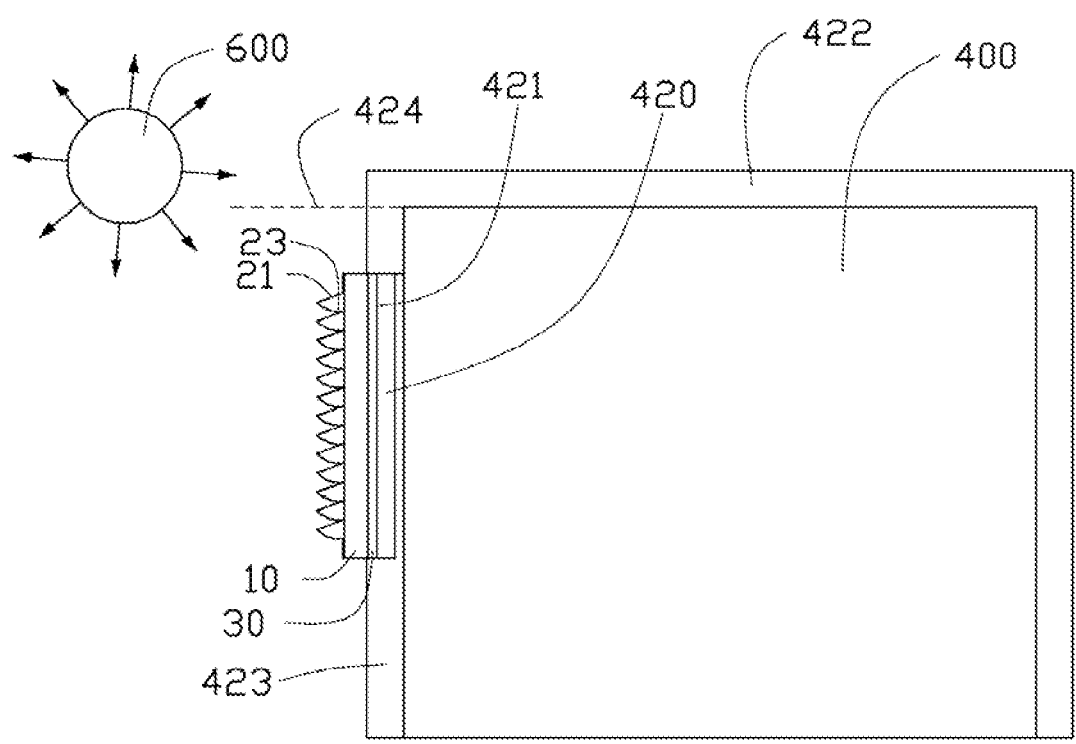
FIG. 2 is a schematic view, showing a working state of the light guide plate of FIG. 1.

Referring to FIGS. 1-2, a light guide plate 100, according to an exemplary embodiment, is shown. The light guide plate 100 is used to guide visible light into a building 400. The light guide plate 100 is attached to an outside surface 421 of a window 420, and includes a substrate 10, a number of horizontally oriented elongated prisms 20, and an optical film 30. The building 400 includes a ceiling 422 and sidewalls 423 downwardly extending from the ceiling 422. The window 420 is located in one of the sidewalls 423.

The substrate 10 is made of transparent material. In this embodiment, the transparent material is polyethylene terephthalate. The substrate 10 includes a first surface 101 and a second surface 102. The first surface 101 and the second surface 102 are positioned at opposite sides of the substrate 10. The first surface 101 faces away from the outside surface 421, and the second surface 102 is attached to the outside surface 421 with adhesive.

The prisms 20 are juxtaposed on the first surface 101 and are parallel to each other. Each prism 20 includes a flat side surface 21 and a curved side surface 23. The flat side surface 21 and the curved side surface 23 extend from the first surface 101 and intersect at a line away from the first surface 101. When the light guide plate 100 is attached to the outside surface 421, the flat side surface 21 of each of the prisms 20 is above the corresponding curved side surface 23. Each of the flat side surfaces 21 faces toward a main plane 424 defined by the ceiling 422, and the corresponding curved side surface 23 faces away from the main plane 424 defined by the ceiling 422. In other words, each flat side surface 21 faces upward, and each curved side surface 23 faces downward. Each of the flat side surfaces 21 is nearer to the ceiling 422 than the corresponding curved side surface 23.

Figure 3:
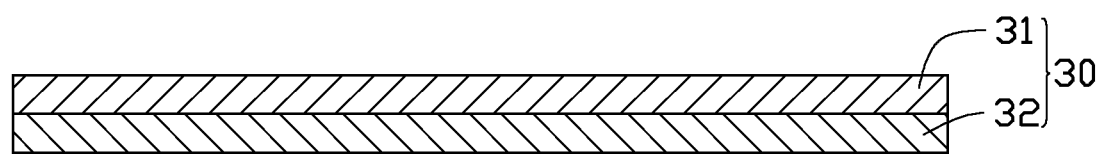
FIG. 3 is a schematic view of the optical film of the light guide plate of FIG. 1.

Referring to FIG. 3, the optical film 30 is attached to the second surface 102 and abuts the outside surface 421. The optical film 30 includes a silver layer 31 and a $TiO_2$ (titanium dioxide) layer 32. The silver layer 31 and the $TiO_2$ layer 32 are arranged in that order from the second surface 102 to the outside surface 421. The thickness of the silver layer 31 is approximately in a range from 8 nanometers (nm) to 30 nm. The silver layer 31 is configured to reflect infrared light that has a wavelength more than 850 nm. The $TiO_2$ layer 32 is configured to absorb ultraviolet light that has a wavelength less than 380 nm.

When in use, light striking the flat side surface 21 roughly perpendicularly passes through to be reflected by the curved side surface 23 onto the ceiling 422. Light striking the flat side surface 21 at other angles will be directly reflected by the flat side surface 21 onto the ceiling 422. Thus, when the elevation angle of the sun 600 is such that the light does not satisfactorily penetrate into the building 400, light is redirected by the light guide plate 100 to better penetrate into the building 400. Therefore, light can reach the ceiling 422 and brighten the whole building 400 anytime sunlight or other outside light source is available. In addition, the silver layer 31 reflects the infrared light that has a wavelength more than 850 nm. In other words, the infrared light that has a wavelength more than 850 nm is prevented to enter into the building 400. Therefore, the rise of the temperature in the building 400 is decreased. Further, the $TiO_2$ layer 32 absorbs the ultraviolet light that has a wavelength less than 380 nm. Therefore, light emitted by an electric lamp in the building 400 does not pass through the $TiO_2$ layer 32, and thereby does not attract insects to the building 400. The exact shape and angle relationships of the prisms 20 may be adjusted according to locale of the building 400 and direction the window 420 faces to maximize light enhancement benefits.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A light guide plate comprising:
   a substrate configured for being mounted on an outside surface of a window of a building, the substrate comprising a first surface and an opposing second surface, the first surface facing away from the outside surface, the second surface facing the outside surface, the substrate made of transparent material; and
   a plurality of horizontally oriented elongated prisms arranged on the first surface and parallel to each other, each prism comprising a flat side surface facing upward and a curved side surface facing downward, the flat side surface and the curved side surface extending from the first surface and intersecting at a line away from the first surface, each flat side surface facing toward a main plane defined by a ceiling of the building, the corresponding curved side surface facing away from the main plane defined by the ceiling, each curved side surface configured for reflecting light passing through the flat side surface to the ceiling of the building.

2. The light guide plate in claim 1, wherein the transparent material is polyethylene terephthalate.

3. The light guide plate in claim 1, further comprising an optical film, wherein the optical film comprises a silver layer and a $TiO_2$ layer, the silver layer is attached to the second surface, and the $TiO_2$ layer is configured for attachment to the outside surface.

4. The light guide plate in claim 3, wherein the thickness of the silver layer is approximately in a range from 8 nm to 30 nm.

5. A light guide plate comprising:
- a substrate configured for being mounted on an outside surface of a window of a building, the building comprising a ceiling and sidewalls downwardly extending from the ceiling, the window located in one of the sidewalls, the substrate comprising a first surface and an opposing second surface, the first surface facing away from the outside surface, the second surface facing the outside surface, the substrate made of transparent material; and
- a plurality of horizontally oriented elongated prisms arranged on the first surface and parallel to each other, each prism comprising a flat side surface facing upward and a curved side surface facing downward, the flat side surface and the curved side surface extending from the first surface and intersecting at a line away from the first surface, each flat side surface positioned above the corresponding curved side surface and being, nearer to the ceiling than the corresponding curved side surface, each curved side surface configured for reflecting light passing through the flat side surface to the ceiling of the building.

6. The light guide plate in claim 5, further comprising an optical film sandwiched between the second surface and the outside surface, wherein the optical film comprises a silver layer and a $TiO_2$ layer arranged in that order from the second surface to the outside surface, the silver layer is attached to the second surface, and the $TiO_2$ layer is attached to the outside surface.

7. The light guide plate in claim 6, wherein the transparent material is polyethylene terephthalate.

8. The light guide plate in claim 7, wherein the thickness of the silver layer is approximately in a range from 8 nm to 30 nm.

9. A light guide plate comprising:
- a substrate configured for being mounted on an outside surface of a window of a building, the substrate comprising a first surface and an opposing second surface, the first surface facing away from the outside surface, the second surface facing the outside surface, the substrate made of transparent material; and
- a plurality of horizontally oriented elongated prisms arranged on the first surface and parallel to each other, each prism comprising a flat side surface facing upward in a direction toward an imaginary upper level corresponding to a top of the building and a curved side surface facing downward in a direction toward an imaginary lower level corresponding to a bottom of the building, the flat side surface and the curved side surface extending from the first surface and intersecting at a line away from the first surface, each curved side surface configured for reflecting light passing through the flat side surface to a ceiling of the building.

10. The light guide plate in claim 9, further comprising an optical film sandwiched between the second surface and the outside surface, wherein the optical film comprises a silver layer and a $TiO_2$ layer arranged in that order from the second surface to the outside surface, the silver layer is attached to the second surface, and the $TiO_2$ layer is attached to the outside surface.

11. The light guide plate in claim 10, wherein the transparent material is polyethylene terephthalate.

12. The light guide plate in claim 11, wherein the thickness of the silver layer is approximately in a range from 8 nm to 30 nm.

* * * * *